(12) United States Patent
Kuwazoe (10) Patent No.: US 8,654,222 B2
(45) Date of Patent: Feb. 18, 2014

(54) IMAGING DEVICE, SIGNAL PROCESSING METHOD, AND COMPUTER PROGRAM

(75) Inventor: Yasuyoshi Kuwazoe, Chiba (JP)

(73) Assignee: Sony Corporation (JP)

( * ) Notice: Subject to any disclaimer, the term of this patent is extended or adjusted under 35 U.S.C. 154(b) by 749 days.

(21) Appl. No.: 12/381,725

(22) Filed: Mar. 16, 2009

(65) Prior Publication Data

US 2009/0244310 A1 Oct. 1, 2009

(30) Foreign Application Priority Data

Mar. 17, 2008 (JP) ................................ P2008-068491

(51) Int. Cl.
*H04N 5/225* (2006.01)
*H04N 9/09* (2006.01)
*H04N 9/097* (2006.01)

(52) U.S. Cl.
USPC ........................................................ 348/262

(58) Field of Classification Search
USPC ............. 348/333.01, 333.11, 333.12, 333.13, 348/343, 344, 207.99, 211.5, 220.1, 222.1, 348/262
See application file for complete search history.

(56) References Cited

U.S. PATENT DOCUMENTS

| | | | | |
|---|---|---|---|---|
| 5,130,814 A * | 7/1992 | Spencer | ........................... | 386/224 |
| 5,926,218 A * | 7/1999 | Smith | ........................ | 348/207.99 |
| 6,288,742 B1 * | 9/2001 | Ansari et al. | ............. | 348/211.14 |
| 7,443,447 B2 * | 10/2008 | Shirakawa | ..................... | 348/376 |
| 2006/0291847 A1 * | 12/2006 | Terada | ............................ | 396/257 |
| 2007/0165133 A1 * | 7/2007 | Shmizu et al. | ................ | 348/362 |
| 2007/0177018 A1 * | 8/2007 | Holmes et al. | ........... | 348/207.99 |

FOREIGN PATENT DOCUMENTS

| | | |
|---|---|---|
| JP | 2000013661 A | 1/2000 |
| JP | 2004023452 A | 1/2004 |
| JP | 2006-267381 A | 10/2006 |
| JP | 2007318644 A | 12/2007 |

OTHER PUBLICATIONS

Office Action from Japanese Application No. 2008-068491, dated Dec. 13, 2011.

* cited by examiner

*Primary Examiner* — Lin Ye
*Assistant Examiner* — Chriss Yoder, III
(74) *Attorney, Agent, or Firm* — Lerner, David, Littenberg, Krumholz & Mentlik, LLP (57) ABSTRACT

An imaging device includes a main image sensor configured to obtain an image used for recording, a sub-image sensor configured to obtain a live view image, an input switching unit, and a signal processor. The input switching unit receives a plurality of sensor outputs including an output of the main image sensor and an output of the sub-image sensor, switches the plurality of received sensor outputs in a time-division manner, and outputs time-division switched signals of the plurality of sensor outputs to the signal processor. The signal processor receives the time-division switched signals from the input switching unit, and executes signal processing on the received time-division switched signals.

15 Claims, 11 Drawing Sheets

IMAGING DEVICE, SIGNAL PROCESSING METHOD, AND COMPUTER PROGRAM

The present application claims priority from Japanese Patent Application No. JP 2008-068491, filed in the Japanese Patent Office on Mar. 17, 2008, the entire content of which is incorporated herein by reference.

BACKGROUND OF THE INVENTION

1. Field of the Invention

The present invention relates to an imaging device, a signal processing method, and a computer program. More specifically, the present invention relates to an imaging device having a live view function for displaying images on a monitor such as a liquid crystal display (LCD), such as a single-lens reflex (SLR) camera, a signal processing method, and a computer program.

2. Description of the Related Art

Observation through optical viewfinders (OVFs) has been in the mainstream of observation of subjects using cameras. Recently, cameras having a "live view display" function for displaying image sensor (imaging element) outputs on displays such as LCDs disposed on the rear surface or the like of the cameras have been increasingly available. As compared to OVFs, viewfinders that use displays such as LCDs are referred to as electronic viewfinders (EVFs). A camera including an OVF and an EVF is disclosed in, for example, Japanese Unexamined Patent Application Publication No. 2006-267381.

In cameras having the live view display function, in which displays are used as viewfinders, it is necessary to process output signals of image sensors (imaging elements) to display live views. It is also necessary to process output signals of the image sensors (imaging elements) to perform photographing and recording processes. Various types of signal processing on image sensor outputs, such as white balance adjustment, gain control, gamma (γ) correction, and color correction, are executed using an image signal processing circuit formed of an integrated circuit (IC) chip or the like.

Figure 1:
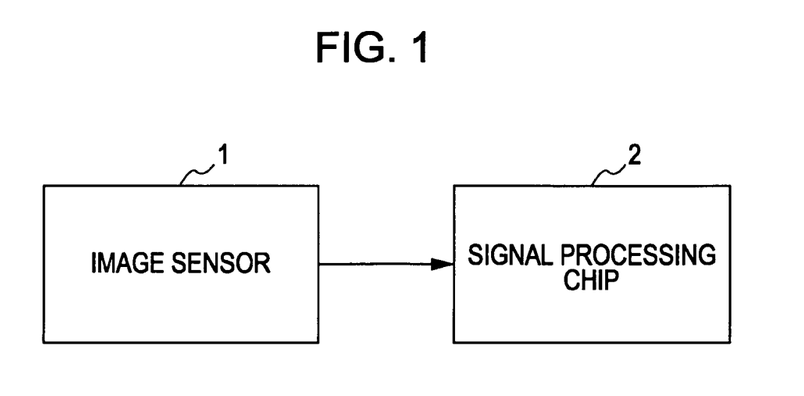
FIG. 1 is a diagram showing an example structure of data transfer between a sensor and a signal processor in a camera having no live view display function.

In a camera involving no display processing in which imaging element outputs are used only for recording processes, as shown in FIG. 1, the output of an image sensor 1 is output to a signal processing chip 2 and the output of the signal processing chip 2 is recorded. The signal processing chip 2 is used only for recording processes. Data transfer between the image sensor 1 and the signal processing chip 2 is performed using, for example, a Sub-Low Voltage Differential Signal (subLVDS) transmission system that allows high-speed data transfer.

Figure 2:
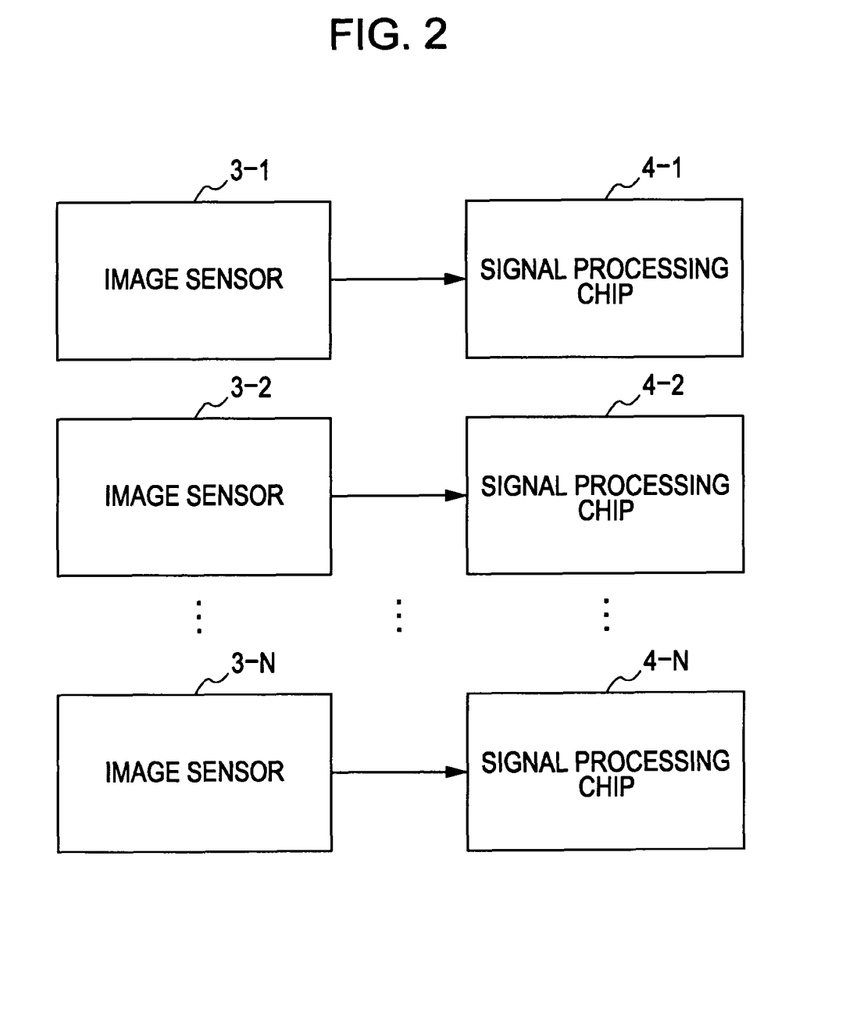
FIG. 2 is a diagram showing an example structure of data transfer between sensors and signal processors in a camera having a live view display function.

Cameras having the live view display function, on the other hand, are provided with an image sensor that outputs data used for recording processes and a sub-image sensor that outputs data used to display live views, and output signals of both image sensors are processed. For example, a camera having more than one, a plurality of image sensors (N image sensors) may be configured to include, as shown in FIG. 2, a plurality of sets (N sets) of image sensors 3-1, to 3-N and signal processing chips 4-1 to and 4-N connected to each other in a one-to-one correspondence. However, signal processing chips are relatively expensive, and the structure described above may lead to an increase in cost.

Figure 3:
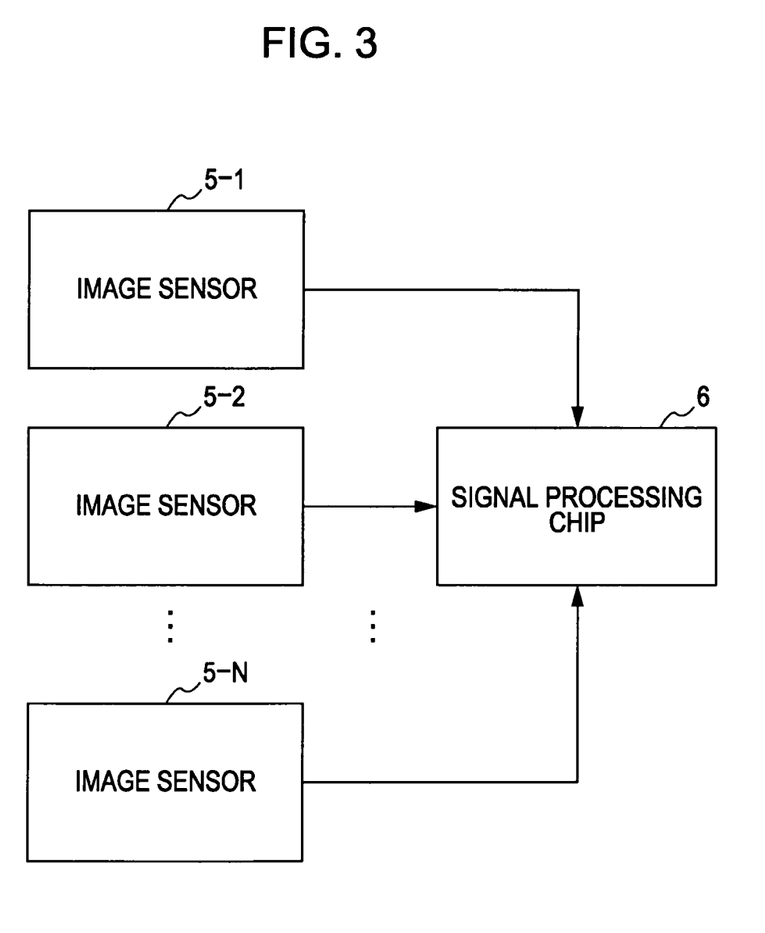
FIG. 3 is a diagram showing an example structure of data transfer between sensors and a signal processor in a camera having a live view display function.

FIG. 3 shows a structure for reducing the number of signal processing chips which are expensive. As shown in FIG. 3, a single signal processing chip 6 is provided with interfaces serving as input units that receive signals from a plurality of image sensors 5-1 to 5-N. The signals received from the image sensors 5-1 to 5-N are switched and processed in the signal processing chip 6. However, this structure has a problem in that, due to the necessity of providing the signal processing chip 6 with additional functions, namely, an interface function for implementing a plurality of inputs and a switching function for switching processing signals, it is difficult to use an existing chip, which may result in a demand for the development of a new chip.

SUMMARY OF THE INVENTION

It is therefore desirable to provide an imaging device, a signal processing method, and a computer program in which a plurality of image sensor outputs can be processed using a single signal processing chip that is implemented by using, without modifying, an existing signal processing chip having one input-signal interface.

In an embodiment of the present invention, an imaging device includes a main image sensor configured to obtain an image used for recording, a sub-image sensor configured to obtain a live view image, an input switching unit, and a signal processor, wherein the input switching unit receives a plurality of sensor outputs including an output of the main image sensor and an output of the sub-image sensor, switches the plurality of received sensor outputs in a time-division manner, and outputs time-division switched signals of the plurality of sensor outputs to the signal processor, and wherein the signal processor receives the time-division switched signals from the input switching unit, and executes signal processing on the received time-division switched signals.

The input switching unit may be configured to input the output of the main image sensor to the signal processor at a higher priority than the output of the sub-image sensor so that the input of the output of the sub-image sensor to the signal processor is stopped during a period in which the output of the main image sensor is input to the signal processor.

The input switching unit may include a memory, and may be configured to execute a process of temporarily storing the output of the main image sensor into the memory, reading the output of the main image sensor from the memory, and outputting the read output of the main image sensor to the signal processor.

The imaging device may further include a mirror configured to switch an optical path of a subject image between the main image sensor and the sub-image sensor. The input switching unit may set a timing at which the output of the main image sensor is output to the signal processor so as to be included in a period during which an output of the sub-image sensor obtained during a non-exposure period of the sub-image sensor is output to the signal processor, the non-exposure period being caused by an operation of the mirror.

The memory may be a memory capable of high-speed reading.

The input switching unit may be configured to output the plurality of sensor outputs to the signal processor using a multi-channel transmission line, and the number of channels used for the output of the sub-image sensor may be equal to or less than the number of channels used for the output of the main image sensor.

The input switching unit may be configured to output the plurality of sensor outputs to the signal processor using a Sub-Low Voltage Differential Signal transmission system.

In another embodiment of the present invention, a signal processing method for executing signal processing in an imaging device includes the steps of obtaining, by a main image sensor, an image used for recording; obtaining a live view image by a sub-image sensor; receiving, by an input switching unit, a plurality of sensor outputs including an output of the main image sensor and an output of the sub-image sensor, switching the plurality of received sensor outputs in a time-division manner, and outputting time-division switched signals of the plurality of sensor outputs to a signal processor; and receiving, by the signal processor, the time-division switched signals from the input switching unit, and executing signal processing on the received time-division switched signals.

The step of receiving by the input switching unit may include the step of inputting the output of the main image sensor to the signal processor at a higher priority than the output of the sub-image sensor so that the input of the output of the sub-image sensor to the signal processor is stopped during a period in which the output of the main image sensor is input to the signal processor.

The step of receiving by the input switching unit may include the step of executing a process of temporarily storing the output of the main image sensor into a memory, reading the output of the main image sensor from the memory, and outputting the read output of the main image sensor to the signal processor.

The imaging device may include a mirror configured to switch an optical path of a subject image between the main image sensor and the sub-image sensor. In the step of receiving by the input switching unit, a timing at which the output of the main image sensor is output to the signal processor may be set so as to be included in a period during which an output of the sub-image sensor obtained during a non-exposure period of the sub-image sensor is output to the signal processor, the non-exposure period being caused by an operation of the mirror.

The memory may be a memory capable of high-speed reading.

The step of receiving by the input switching unit may include the step of outputting the plurality of sensor outputs to the signal processor using a multi-channel transmission line, and the number of channels used for the output of the sub-image sensor may be equal to or less than the number of channels used for the output of the main image sensor.

The step of receiving by the input switching unit may include the step of outputting the plurality of sensor outputs to the signal processor using a Sub-Low Voltage Differential Signal transmission system.

In still another embodiment of the present invention, a computer program for executing signal processing in an imaging device includes the steps of causing a main image sensor to obtain an image used for recording; causing a sub-image sensor to obtain a live view image; causing an input switching unit to receive a plurality of sensor outputs including an output of the main image sensor and an output of the sub-image sensor, switch the plurality of received sensor outputs in a time-division manner, and output time-division switched signals of the plurality of sensor outputs to a signal processor; and causing the signal processor to receive the time-division switched signals from the input switching unit, and execute signal processing on the received time-division switched signals.

The program according to the embodiment of the present invention may be, for example, a program that can be provided through storage media or communication media in a computer-readable format to a general-purpose system that can execute various program codes. With the provision of the program in a computer-readable format, the processing in accordance with the program is implemented on a computer system.

Other features and advantages of the embodiments of the present invention will become apparent from the following detailed description of exemplary embodiments of the present invention taken in conjunction with the drawings. As used herein, the term "system" refers to a logical set of a plurality of apparatuses. Note that the apparatuses may not necessarily be disposed in the same housing.

According to an embodiment of the present invention, therefore, an input switching unit is configured to switch a plurality of sensor outputs including an output of a main image sensor that obtains an image used for recording and an output of a sub-image sensor that obtains a live view image in a time-division manner and to output the time-division switched sensor outputs to a signal processor. This configuration enables a plurality of sensor outputs to be processed using a general-purpose signal processor including a single signal input unit. The input switching unit is further configured to store the output of the main image sensor into a memory, read it from the memory, and output it to the signal processor. The output timing of the output of the main image sensor is set so as to be included in a data output period within a period during which the sub-image sensor is not exposed to light due to an operation of the mirror. This configuration can reduce the non-display period of live view images subjected to exposure.

DESCRIPTION OF THE PREFERRED EMBODIMENTS

An imaging device, a signal processing method, and a computer program according to an embodiment of the present invention will be hereinafter described in detail with reference to the drawings.

Figure 4:
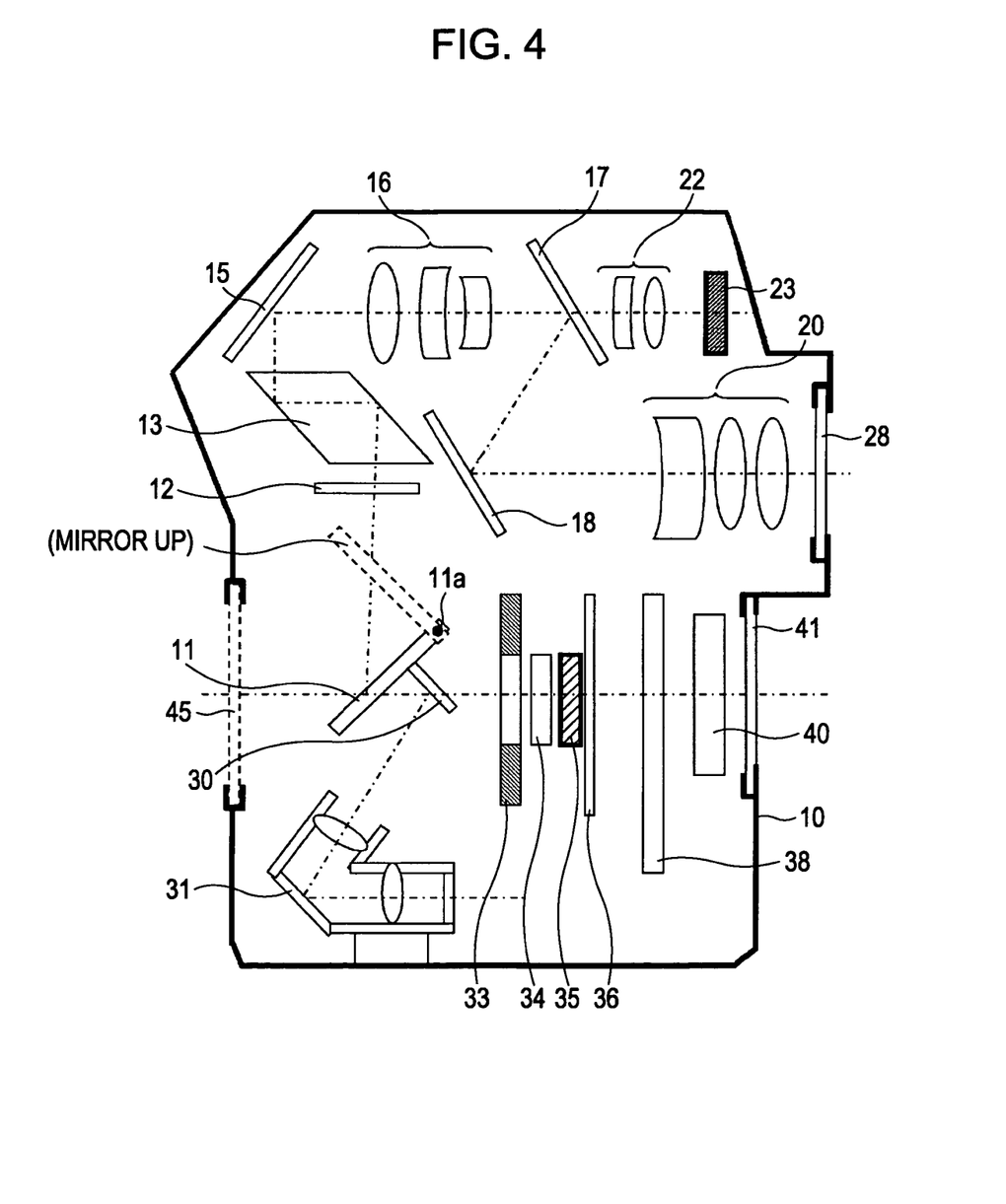
FIG. 4 is a diagram showing an example internal structure of an SLR camera serving as an example of a camera according to an embodiment of the present invention.

First, an example structure of a camera according to an embodiment of the present invention will be described with reference to FIGS. 4 and 5. FIG. 4 is a diagram showing an internal structure of a digital SLR camera serving as an example of a camera according to an embodiment of the present invention, and FIG. 5 is a diagram showing a hardware configuration thereof.

Figure 5:
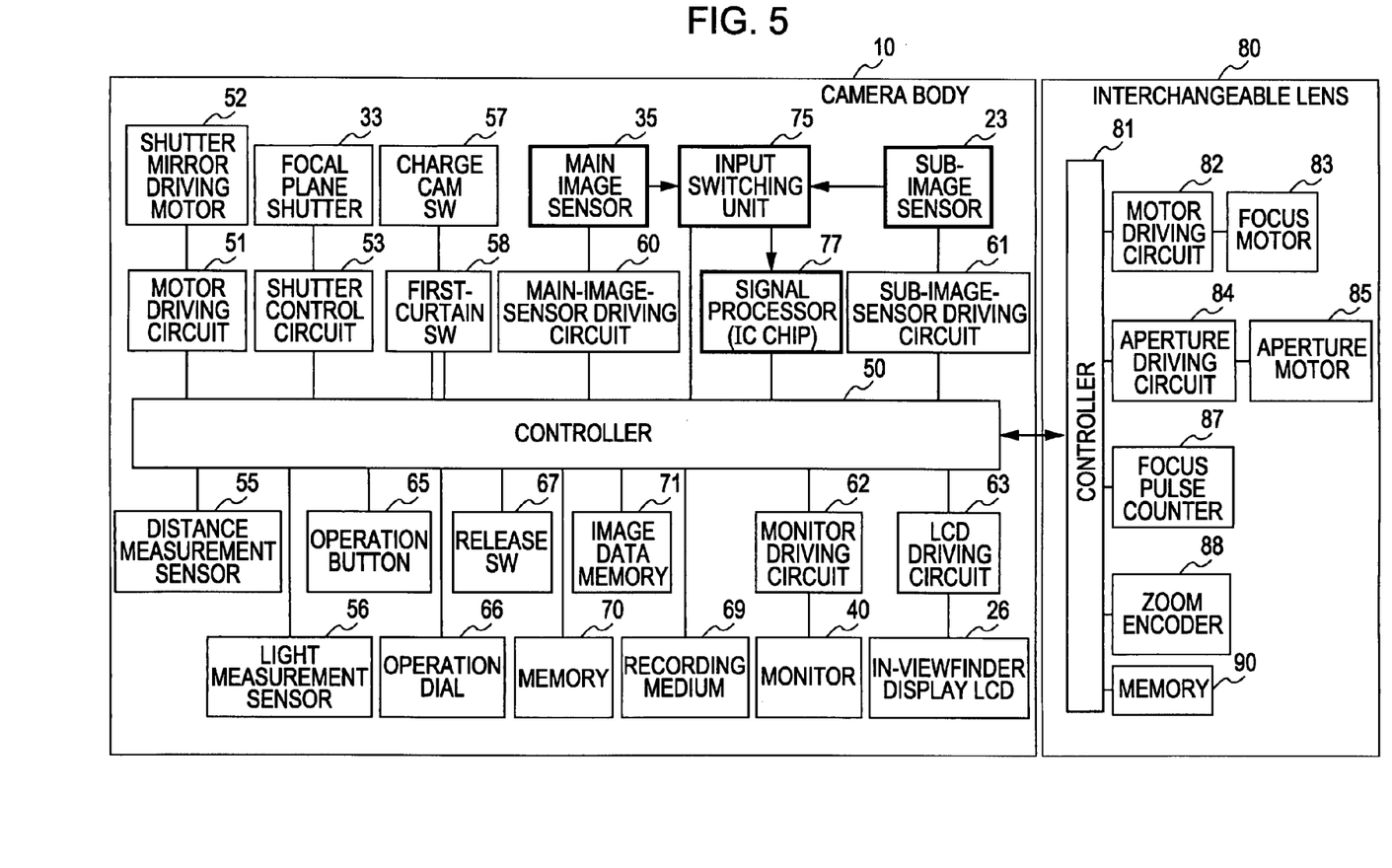
FIG. 5 is a diagram showing a hardware configuration of an SLR camera serving as an example of a camera according to an embodiment of the present invention.

Referring to FIGS. 4 and 5, a main image sensor 35 is an image sensor that outputs an image signal used for recording, and a sub-image sensor 23 is an image sensor that outputs an image signal used to display live views on a monitor 40. Each of the sensors 35 and 23 may be formed of, for example, a complementary metal-oxide semiconductor (CMOS) sensor, charged-coupled device (CCD) sensor, or any other suitable sensor. The outputs from the two sensors are input to a single signal processing chip, namely, a signal processor (IC chip) 77 shown in FIG. 5, for signal processing. Data transfer between the sensors 35 and 23 and the signal processor 77 and a signal processing structure will be described in detail below.

The digital SLR camera (hereinafter, short for camera) shown in FIG. 4 is mainly formed of an interchangeable lens (not shown) and a camera body 10 serving as a main body of the camera. A desired interchangeable lens is detachably attached to a body mount 45 on a front surface of the camera body 10.

Subject light flux incident from the interchangeable lens (not shown) is reflected by a surface of a main mirror 11 a portion of which is formed of a half mirror, and further enters a prism 13 through a screen 12. The subject light flux entering the prism 13 is reflected by an internal reflecting surface of the prism 13 and a mirror A (hereinafter referred to as a "mirror (A)") 15, and is further reflected by a mirror B (hereinafter referred to "mirror (B)") 17 and a mirror C (hereinafter referred to as a "mirror (C)") 18 through a relay lens system 16 having a plurality of lenses. The reflected light flux passes through an eyepiece lens system ("loupe" optical system) 20 having a plurality of lenses for observation by a viewer's eye (not shown) through a viewfinder 28. The prism 13, the mirror (A) 15, the relay lens system 16, the mirror (B) 17, and the mirror (C) 18 form a relay optical system. This relay optical system is designed to allow a subject image formed on the screen 12 to be refocused between the mirror (C) 18 and the eyepiece lens system 20.

The mirror (B) 17 is formed of a half mirror, and a portion of the incident light is transmitted through the mirror (B) 17 and is directed into the sub-image sensor 23 through a refocus lens system 22 of a refocus optical system located behind the mirror (B) 17. The sub-image sensor 23 forms a second imaging element while the main image sensor 35 forms a first imaging element described below. The sub-image sensor 23 is an image sensor that generates an image signal for displaying a substantially real-time moving image as a through-image on the monitor 40. In other words, the sub-image sensor 23 is an image sensor for generating live view images (LV images).

The subject light flux transmitted through the main mirror 11 is reflected by a sub-mirror 30 disposed on a rear surface of the main mirror 11, and is directed into an autofocus (AF) unit 31 used for automatic distance measurement. The main mirror 11 is disposed rotatably about a shaft 11a. During the observation of the subject, the main mirror 11 is positioned at a position indicated by a solid line shown in FIG. 4 to provide an optical path to the sub-image sensor 23 serving as an image sensor for generating live view images (LV images).

When photographing starts, the main mirror 11 rotates and moves upward with respect to the shaft 11a and reaches a position (retraction position) indicated by a broken line shown in FIG. 4 ("up"). When the photographing ends, the main mirror 11 rotates and moves downward with respect to the shaft 11a and reaches the position indicated by the solid line ("down"). In this up-down period, the optical path to the sub-image sensor 23 serving as an image sensor for generating live view images (LV images) is blocked. The sub-mirror 30 is folded when the main mirror 11 is moved to the retraction position, and is also moved to the retraction position together with the main mirror 11.

A focal plane shutter 33, a low-pass filter 34, and a main image sensor 35 attached to an imager plate 36 are disposed behind the main mirror 11 along a photographic optical axis. The main image sensor 35 serves as a first imaging element. A substrate 38 having various electric components is disposed behind the imager plate 36. The monitor 40 is disposed behind the substrate 38. The monitor 40 serves as a display unit such as an LCD. A photographer can view an image displayed on the screen of the monitor 40 through a monitor window 41 disposed on a rear surface of the camera body 10.

On the monitor 40, as described above, an image obtained by the sub-image sensor 23 serving as an image sensor for generating live view images (LV images) is displayed.

FIG. 5 is a block diagram showing a structure of an electrical system of the digital SLR camera according to the present embodiment. In the camera shown in FIG. 5, an interchangeable lens 80 is attached to the body mount 45 described with reference to FIG. 4.

In FIG. 5, a controller 50 serves as a control unit for controlling the overall operation of the camera and performing arithmetic operations, and is formed of, for example, a central processing unit (CPU). The controller 50 is connected to a shutter mirror driving motor 52 through a motor driving circuit 51, and is also connected to the focal plane shutter 33 through a shutter control circuit 53. The controller 50 is further connected to a distance measurement sensor 55 provided in the AF unit 31, a light measurement sensor 56 for measuring the brightness of the subject, a charge cam switch (SW) 57 that is switched when shutter charge is performed, a first-curtain switch (SW) 58 attached to a first curtain (not shown) of the focal plane shutter 33 and arranged to detect the full opening of the focal plane shutter 33, a main-image-sensor driving circuit 60 for driving the main image sensor 35, a sub-image-sensor driving circuit 61 for driving the sub-image sensor 23, a monitor driving circuit 62 for driving the monitor 40, and an LCD driving circuit 63 for driving an in-viewfinder display LCD 26.

The controller 50 is further connected to the signal processor (IC chip) 77 for processing the output signals of the main image sensor 35 and the sub-image sensor 23, and an input switching unit 75 for switching between the output signals of the main image sensor 35 and the sub-image sensor 23 to be input to the signal processor 77.

The controller 50 is further connected to an operation button 65, an operation dial 66, a release switch (SW) 67, a recording medium 69, a memory 70, and an image data memory 71. The operation button 65 includes a menu button, a cross key, and an OK button, which are not shown in the figure, and is used to perform various operations of the camera. The operation dial 66 is an operation member for setting a shooting mode during photographing.

The release switch 67 is a button used to execute a pre-shooting operation and an exposure operation. The release switch 67 includes two-step switches, namely, a first release switch and a second release switch. A release button (not shown) is pressed halfway to turn on the first release switch so that a pre-shooting operation including a light measurement process and a distance measurement process is executed. The release button is fully pressed to turn on the second release switch so that the exposure operation is executed.

The recording medium 69 is a recording medium removable from the camera body 10 through an interface (not shown) of the camera, such as a memory card or an external hard disk drive (HDD). A control program for controlling the overall operation of the digital camera is stored in the memory 70 in advance. The image data memory 71 is a memory for temporarily holding image data.

The interchangeable lens 80 includes a controller 81. The controller 81 is formed of a CPU or the like for controlling the driving of each component in the interchangeable lens 80. The controller 81 is connected to a focus motor 83 through a motor driving circuit 82, an aperture motor 85 through an aperture driving circuit 84, a focus pulse counter 87, a zoom encoder 88, and a memory 90.

The focus motor 83 is a motor for driving a focus lens (not shown) in the interchangeable lens 80 on the basis of a distance measurement result of the distance measurement sensor 55 in the camera body 10. The aperture motor 85 is a motor for driving an aperture (not shown) in the interchangeable lens 80 on the basis of a light measurement result of the light measurement sensor 56 in the camera body 10. The focus pulse counter 87 is configured to detect a movement of the focus lens to perform position control before the focus lens is driven. The zoom encoder 88 detects a movement signal according to the focal length of a photographing lens (not shown), and outputs the movement signal to the controller 81. The memory 90 stores lens information regarding the interchangeable lens 80.

The controller 81 is electrically connected to the controller 50 in the camera body 10 via a communication connector or the like (not shown). The controller 81 is controlled in accordance with an instruction of the controller 50 of the camera body 10.

The main image sensor 35 shown in FIGS. 4 and 5 is an image sensor that outputs an image signal used for recording, and the sub-image sensor 23 is an image sensor that outputs an image signal used to display a live view on the monitor 40.

As shown in FIG. 5, the outputs of the main image sensor 35 and the sub-image sensor 23 are input to the input switching unit 75 and are then input to the signal processor (IC chip) 77. Upon receipt of the outputs of the sensors 35 and 23, the signal processor 77 executes various types of signal processing such as white balance adjustment, gain control, gamma correction, and color correction. The signal processor 77 receives signals complying with, for example, the subLVDS transmission system.

The signal processor (IC chip) 77 is a general-purpose signal processing IC chip having one signal input unit. Examples according to the embodiment of the present invention will now be described in the context of a connection structure between the main image sensor 35, the sub-image sensor 23, the input switching unit 75, and the signal processor 77, data transfer therebetween, and a signal processing structure.

Figure 6:
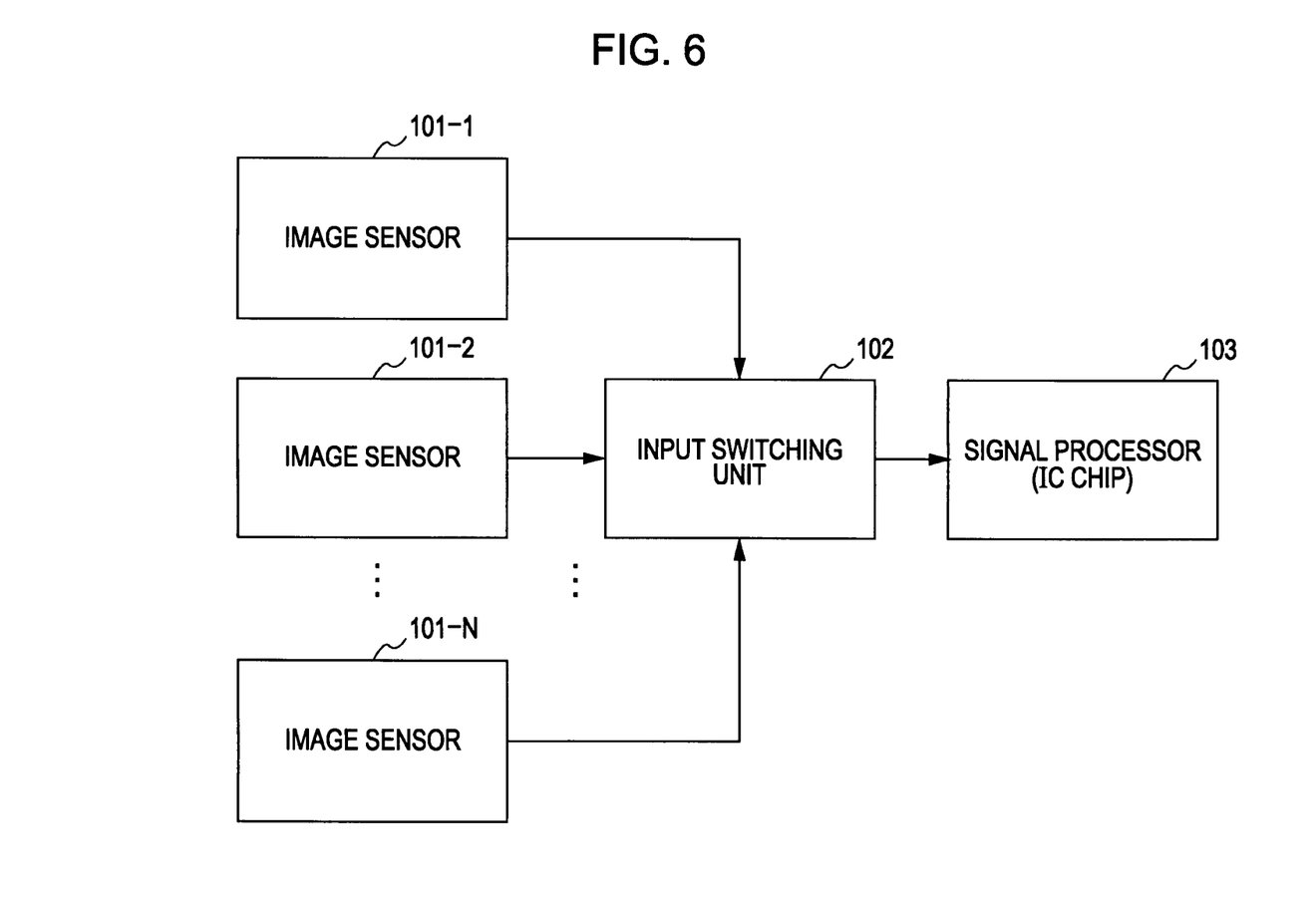
FIG. 6 is a diagram showing an example structure for transferring data between sensors and a signal processor in a camera having a live view display function according to an example of an embodiment of the present invention.

First, the structure of a basic example of the embodiment of the present invention will be described with reference to FIG. 6. In FIG. 6, a plurality of image sensors 101-1 to 101-N, an input switching unit 102, and a signal processor (IC chip) 103 are illustrated. At least one of the plurality of image sensors 101-1 to 101-N is a sensor for obtaining an image used for recording of a photographed image, and corresponds to the main image sensor 35 shown in FIGS. 4 and 5. Further, at least one image sensor is a sensor for obtaining images used to display live view images on a monitor, and corresponds to the sub-image sensor 23 shown in FIGS. 4 and 5. In FIG. 6, value N (where N≥2) is used to provide a generalized illustration of image sensors.

In this structure, the signal processor (IC chip) 103 is a general-purpose signal processing IC chip having one signal input unit, and is configured to execute various types of signal processing on an input signal, such as white balance adjustment, gain control, gamma correction, and color correction. Signal transmission between the input switching unit 102 and the signal processor (IC chip) 103 is performed using, for example, the subLVDS transmission system that realizes high-speed data transfer. The number of channels may be, for example, eight.

The input switching unit 102 is formed of, for example, an IC chip, and includes a plurality of input units that receive signals from the plurality of image sensors 101-1 to 101-N and one output unit that outputs a selection signal to the signal processor (IC chip) 103. Like the signal transmission between the input switching unit 102 and the signal processor (IC chip) 103 described above, signal transmission between the plurality of image sensors 101-1 to 101-N and the input switching unit 102 is also performed according to the subLVDS transmission system that realizes high-speed data transfer. SubLVDS is an example of the transmission systems, and any other signal transmission system may be used.

In this example of the embodiment, the signal processor (IC chip) 103 receives, for example, data inputs complying with the 8-channel subLVDS system from the input switching unit 102, and can be implemented by a general-purpose IC chip without modifying it.

In this example of the embodiment, the general-purpose signal processor (IC chip) 103 can be used with a simple structure in which the input switching unit 102 with multiple inputs (N inputs) and one output is connected between the plurality of image sensors 101-1 to 101-N and the signal processor (IC chip) 103. Unlike the signal processor 103, the input switching unit 102 is formed of a circuit that does not involve the execution of complex processing and can be therefore manufactured as a relatively low-cost chip. Thus, a plurality of image sensor outputs can be processed using the single signal processor (IC chip) 103 without increasing total cost. The input switching unit 102 may be configured to have, in addition to a simple input/output switching function, a circuit for performing signal processing or the like on each image sensor output.

Next, exemplary operations in the following two specific examples based on the basic example of the embodiment described above will be described with reference to FIGS. 7 to 11.

(1) An example structure in which an input switching unit does not include a memory for temporarily buffering image sensor outputs.

(2) An example structure in which an input switching unit includes a memory for temporarily buffering image sensor outputs.

Figure 7:
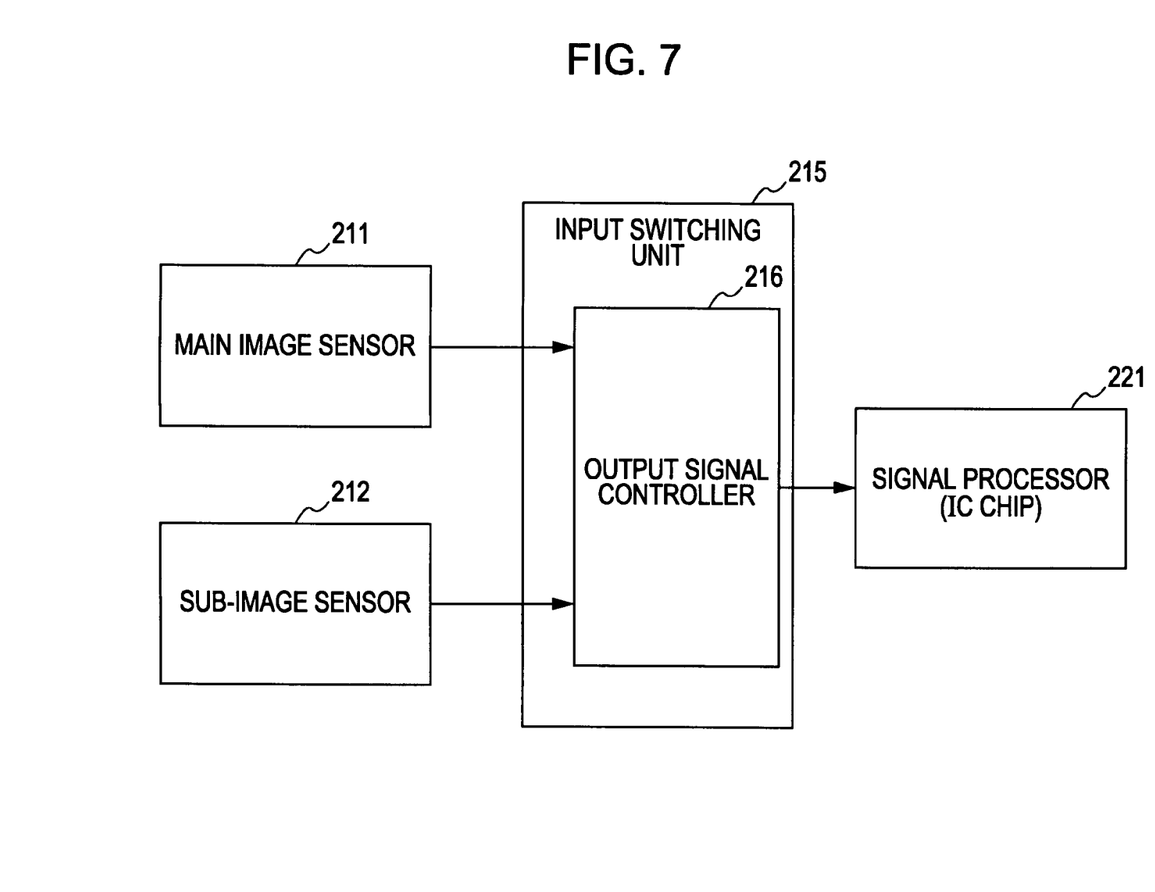
FIG. 7 is a diagram showing an example structure for transferring data between sensors and a signal processor in a camera having a live view display function according to an example of an embodiment of the present invention.

First, an exemplary operation in the first example in which an input switching unit does not include a memory for temporarily buffering image sensor outputs will be described with reference to FIGS. 7 to 9. A similar process is performed when the input switching unit includes a memory but does not use it. As shown in FIG. 7, each of a main image sensor 211 and a sub-image sensor 212 outputs obtained data to an input switching unit 215. An output signal controller 216 of the input switching unit 215 selects one of the two sensor inputs and outputs the selected sensor input to a signal processor 221.

The main image sensor 211 shown in FIG. 7 is a sensor that outputs an image used for a recording image, and corresponds to the main image sensor 35 described with reference to FIGS. 4 and 5. The sub-image sensor 212 is a sensor that outputs an image used for a live view image to be displayed on a monitor, and corresponds to the sub-image sensor 23 described with reference to FIGS. 4 and 5.

In the example structure shown in FIG. 7, the input switching unit 215 does not include a memory for temporarily buffering image sensor outputs. Thus, the output signal controller 216 of the input switching unit 215 switches input data of live view images that are input from the sub-image sensor 212 and images used for recording that are input from the main image sensor 211 on a frame-by-frame basis and outputs the input data to the signal processor 221. The process described above is also performed when the memory is provided but is not used. If there is no input from the main image sensor 211, the live view images input from the sub-image sensor 212 are output to the signal processor 221. When an input from the main image sensor 211 occurs, the output of the live view images input from the sub-image sensor 212 is stopped and the input from the main image sensor 211, which is a signal used for recording, is preferentially output to the signal processor 221.

As described above, the signal transmission from the input switching unit 215 to the signal processor (IC chip) 221 is performed according to, for example, the subLVDS transmission system that realizes high-speed data transfer. The subLVDS transmission line uses an 8-channel transmission line, and the image size of a main image is greater than or equal to that of a live view image.

Figure 8:
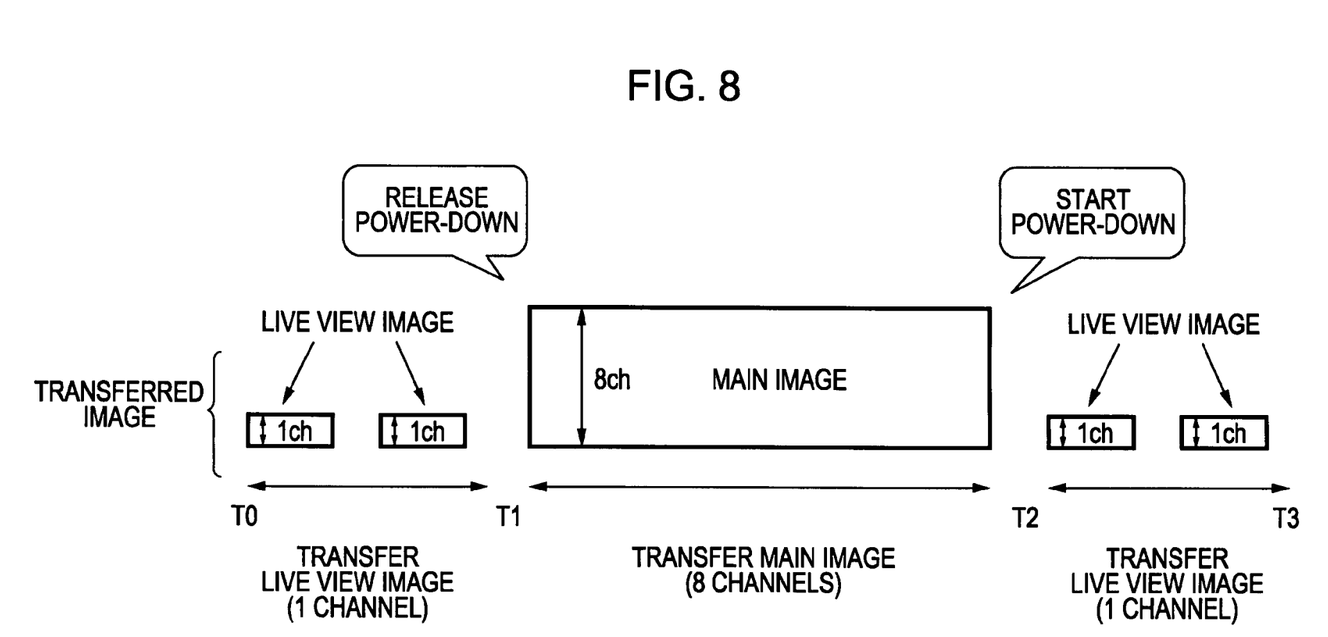
FIG. 8 is a diagram showing an exemplary data transfer process for transferring a main image serving as an image used for recording and live view images to the signal processor.

In a transmission process according to an example of the embodiment of the present invention, as shown in FIG. 8, it is assumed that a main image is transmitted using eight subLVDS channels while a live view image is transmitted using one subLVDS channel. In this manner, by controlling the number of channels used for transmission of live view images, power consumption can be reduced. A combination of the numbers of channels may be, but not limited to, one and eight. For example, the sub-image sensor output is transmitted using channels the number of which is equal to or less than the number of channels used for the main image sensor output.

Figure 9:
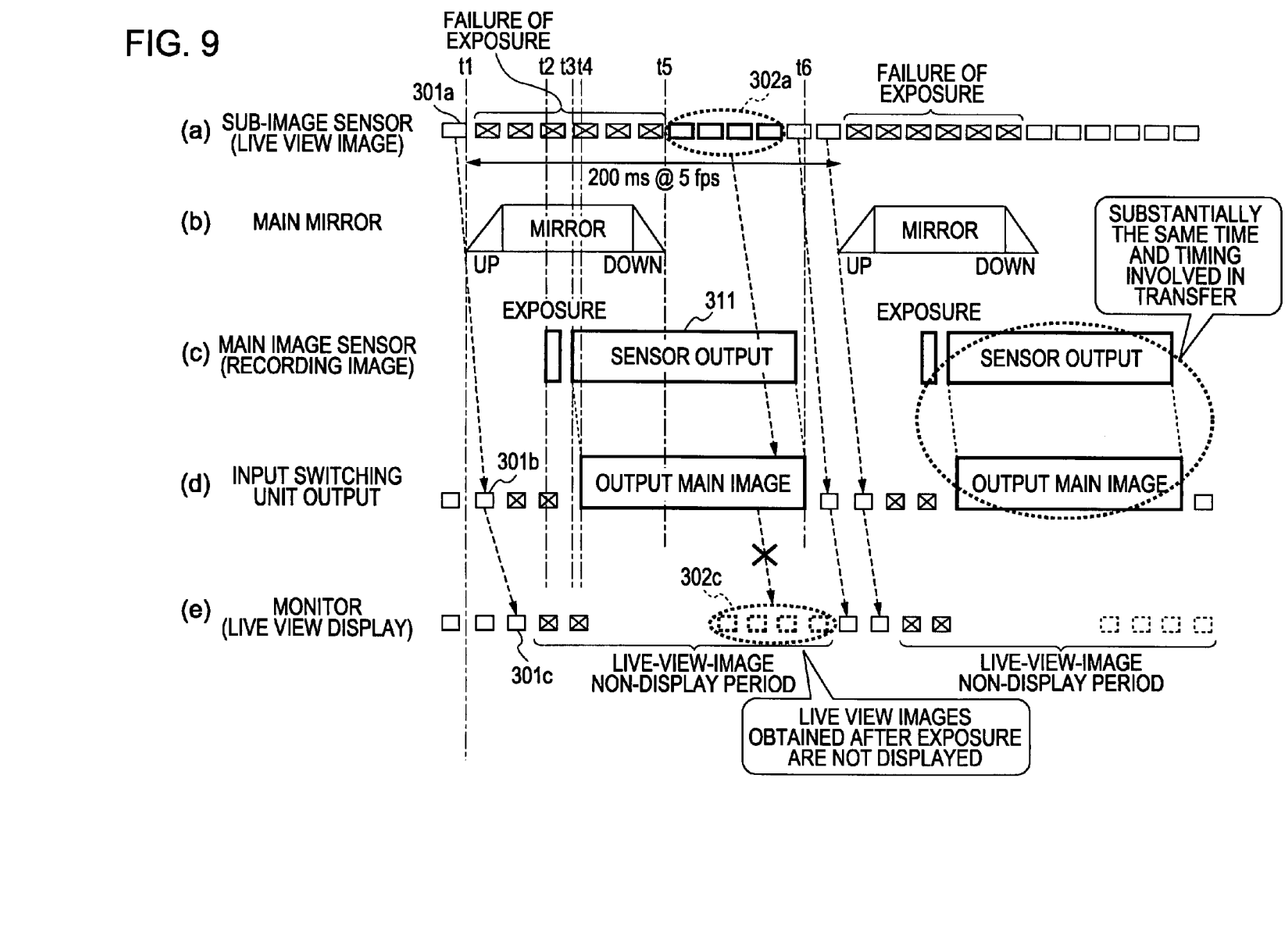
FIG. 9 is a diagram showing an exemplary operation in a structure in which an input switching unit shown in FIG. 7 does not include a memory for temporarily buffering image sensor outputs.

FIG. 9 is a timing chart describing signal input and output timings. In FIG. 9, the following signal input and output and operation timings are shown with time increasing from left to right.

(a) Sub-image sensor output (live view image)
(b) Main mirror operation (the operation of the main mirror 11 shown in FIG. 4)
(c) Main image sensor output (recording image)
(d) Input switching unit output
(e) Monitor output (live view display)

The sub-image sensor output (live view image) (see part (a) of FIG. 9) is changed in accordance with a photographing process. For example, in the case of continuous shooting, frame images are output to an input switching unit at intervals of 200 ms, that is, at a rate of five frames per second. In the example of FIG. 9, an exemplary process in which the sub-image sensor output (live view image) is input to the input switching unit at a rate of 60 frames per second is shown. For example, an output frame 301a of a sub-image sensor is input to the input switching unit, input to a signal processor as an input switching unit output 301b (see part (d) of FIG. 9), and displayed in live view as an output frame 301c on a monitor after predetermined signal processing is executed (see part (e) of FIG. 9).

When a photographing process is executed, however, as shown in part (b) of FIG. 9, a main mirror starts the move-up operation ("up") at the start of photographing, and starts moving to the position of the main mirror 11 as indicated by the broken line shown in FIG. 4. Thus, as shown in FIG. 4, the optical path to the sub-image sensor 23 is blocked. The sub-image sensor is not exposed to light until the main mirror is returned to the original state ("down") after the photographing ends. Thus, the sub-image sensor is prevented from being exposed to light during a period from time t1 to time t5 shown in FIG. 9.

After the main mirror has been completely moved up, at time t2, a main image sensor (in the example shown in FIG. 4, the main image sensor 35) is exposed to light. Then, the output of data from the main image sensor is started at time t3, and a main image used for recording is transferred to the input switching unit.

Since the input switching unit has no memory, the input switching unit immediately outputs the input data to the signal processor. The output is started at time t4 shown in FIG. 9. Thereafter, for a period until time t6, the image data corresponding to the image used for recording, which is obtained by the main image sensor, is output from the input switching unit to the signal processor.

During the period from time t4 to time t6, the data transfer line from the input switching unit to the signal processor is occupied by the main image that is an image used for recording. Therefore, signals input from the sub-image sensor to the input switching unit during this period are not output to the signal processor, and the live view display of images during this period is interrupted.

As a result, live view images for a period from time t1 at which the move-up operation of the main mirror starts ("UP") (see part (b) of FIG. 9) to time t6 at which the output of the main image from the input switching unit to the signal processor ends are not displayed on the monitor. As shown in part (e) of FIG. 9, this period is referred to as a live-view-image non-display period.

The first half period of this live-view-image non-display period is a portion where the sub-image sensor is not exposed to light due to the mirror operation. The second half period is an image non-display portion caused by the occupation of the output channels from the input switching unit to the signal processor by the main image although the sub-image sensor is exposed to light during this period, that is, data sets 302a and 302c shown in parts (a) and (e) of FIG. 9.

In this manner, the input switching unit does not include a memory for temporarily storing image sensor outputs, resulting in a long live-view-image non-display period. That is, the output channels from the input switching unit to the signal processor are occupied for the transmission of the main image, which prevents the images obtained by the sub-image sensor as a from being displayed although the exposure of the sub-image sensor has been performed.

Next, an exemplary operation in the second example in which an input switching unit includes a memory for temporarily storing image sensor outputs in order to overcome this inconvenience will be described with reference to FIGS. 10 to 11.

Figure 10:
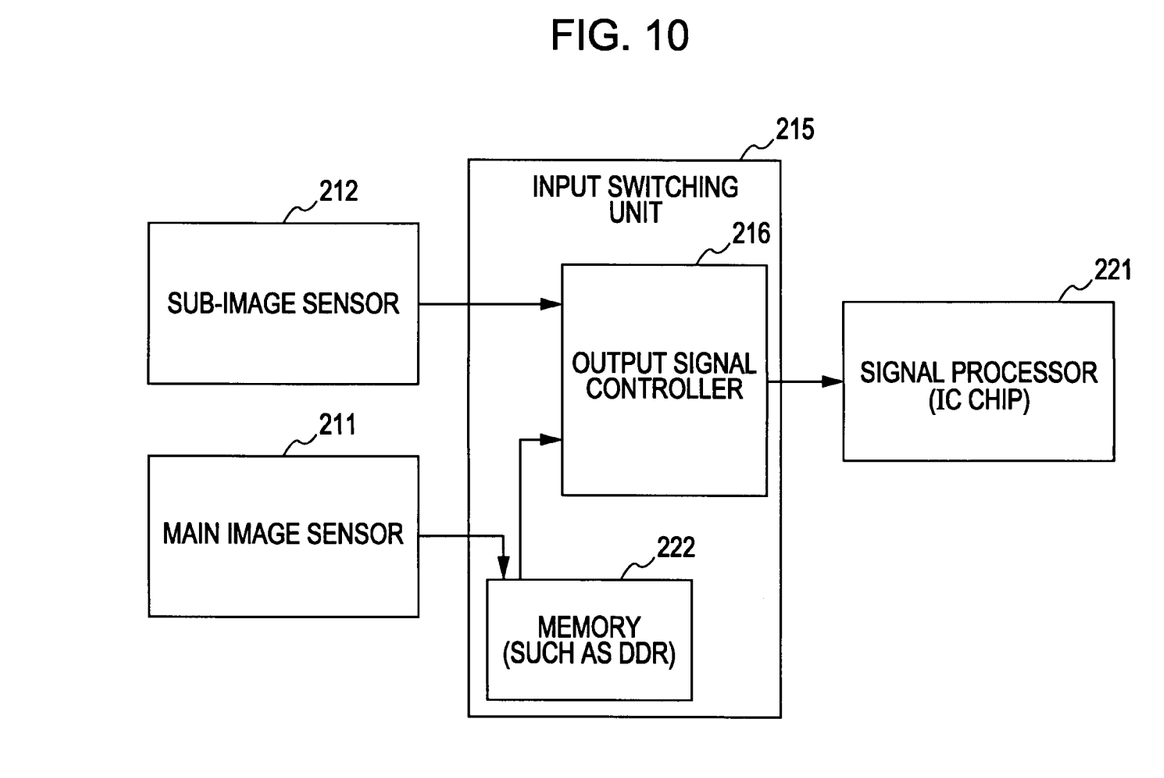
FIG. 10 is a diagram showing an example structure for transferring data between sensors and a signal processor in a camera having a live view display function according to an example of an embodiment of the present invention.

FIG. 10 shows a structure of an input switching unit 215 that includes a memory 222 for temporarily buffering image sensor outputs. In FIG. 10, each of a main image sensor 211 and a sub-image sensor 212 outputs obtained data to the input switching unit 215. An output signal controller 216 of the input switching unit 215 selects one of the two sensor inputs and outputs the selected sensor input to a signal processor 221.

The main image sensor 211 shown in FIG. 10 is a sensor that outputs an image used for a recording image, and corresponds to the main image sensor 35 described with reference to FIGS. 4 and 5. The sub-image sensor 212 is a sensor that outputs an image used for a live view image to be displayed on a monitor, and corresponds to the sub-image sensor 23 described with reference to FIGS. 4 and 5.

In the structure shown in FIG. 10, the input from the main image sensor 211 to the input switching unit 215 is temporarily stored in the memory 222. The memory 222 may be, for example, a double data rate (DDR) memory capable of high-speed recording and reading. The input switching unit 215 outputs a main image signal used for recording, which is recorded on the memory 222, to the signal processor 221 at a predetermined time. Specifically, the main image signal is output at a timing so as not to inhibit as much as possible the effective monitor display of live view images obtained after exposure.

Figure 11:
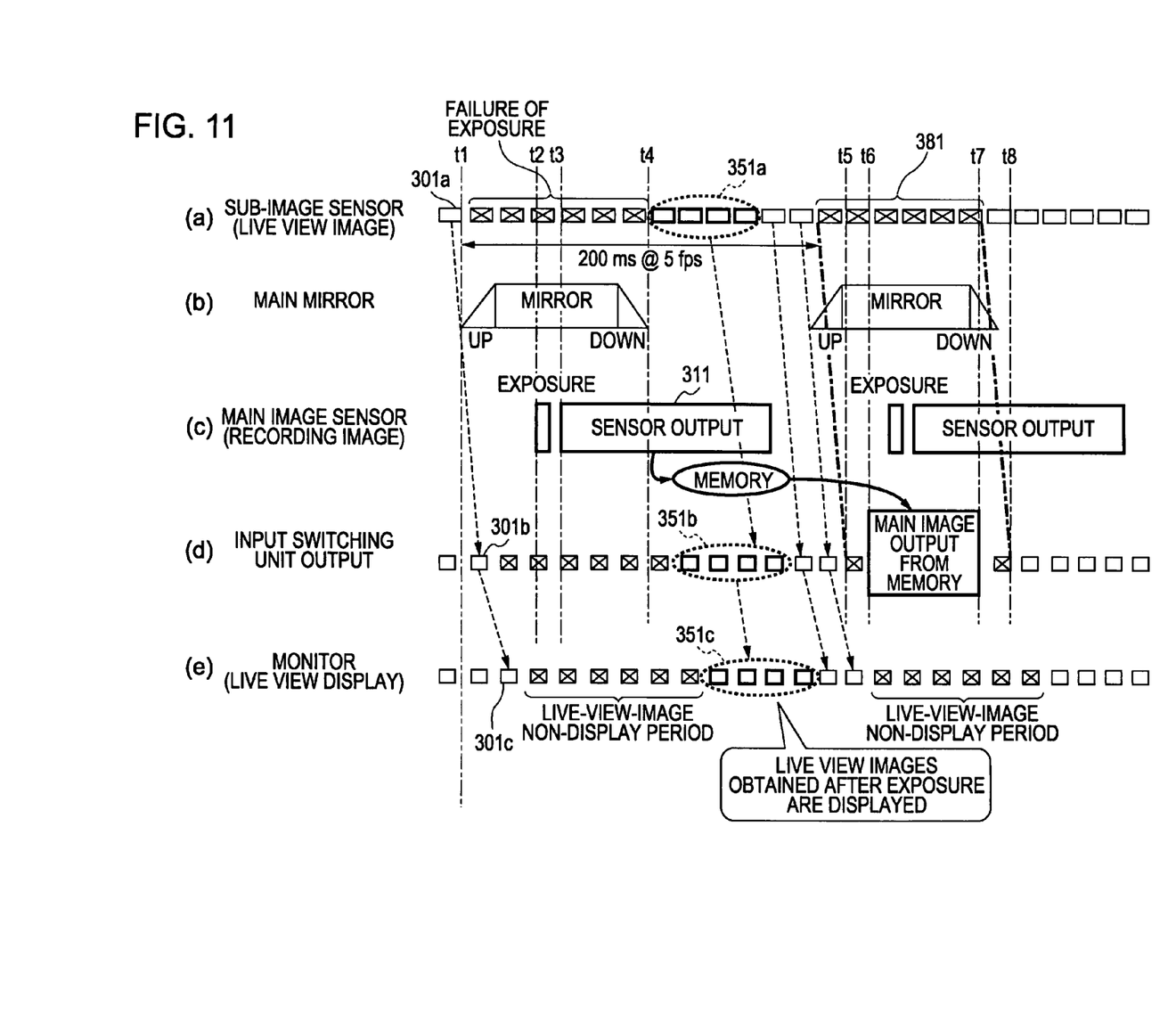
FIG. 11 is a diagram showing an exemplary operation in a structure in which an input switching unit shown in FIG. 10 includes a memory for temporarily buffering image sensor outputs.

FIG. 11 is a timing chart describing signal input and output timings of the present exemplary embodiment. In FIG. 11, like FIG. 9, as described above, the following signal input and output and operation timings are shown with time increasing from left to right.

(a) Sub-image sensor output (live view image)
(b) Main mirror operation (the operation of the main mirror 11 shown in FIG. 4)
(c) Main image sensor output (recording image)
(d) Input switching unit output
(e) Monitor output (live view display)

Also in this example of the embodiment, the sub-image sensor output (live view image) (see part (a) of FIG. 11) is changed in accordance with a photographing process. For example, in the case of continuous shooting, frame images are output to an input switching unit at intervals of 200 ms, that is, at a rate of five frames per second. In the example shown in FIG. 11, like FIG. 9, an exemplary process in which the sub-image sensor output (live view image) is input to the input switching unit at a rate of 60 frames per second is shown. For example, an output frame 301a of a sub-image sensor is input to the input switching unit, input to a signal processor as an input switching unit output 301b (see part (d) of FIG. 11), and displayed in live view as an output frame 301c on a monitor after predetermined signal processing is executed (see part (e) of FIG. 11).

When a photographing process is executed, as shown in part (b) of FIG. 11, a main mirror starts the move-up operation ("up") at the start of photographing, and the sub-image sensor is not exposed to light until the main mirror is returned to the original position ("down") after the photographing ends. Thus, the sub-image sensor is not exposed to light during a period from time t1 to time t4 shown in FIG. 11.

After the main mirror has been completely moved UP, at time t2, a main image sensor (in the example shown in FIG. 4, the main image sensor 35) is exposed to light. Then, the output of data from the main image sensor is started at time t3, and a main image used for recording is transferred to the input switching unit.

In this example of the embodiment, as described with reference to FIG. 10, the input switching unit 215 includes the memory 222, and the data from the main image sensor 211 is stored in the memory 222 of the input switching unit 215. That is, unlike the example shown in FIG. 9, the input switching unit 215 does not immediately output the input data to the signal processor 221.

In the example shown in FIG. 9, the data input of the main image used for recording from the main image sensor to the input switching unit is executed substantially at the same time as the data output from the input switching unit to the signal processor, and this period of data output from the input switching unit to the signal processor may cause difficulty in outputting the output of the sub-image sensor subjected to exposure to the signal processor.

In this exemplary process, for example, as shown in FIG. 11, at the time when data obtained in a period (non-exposure period) 381 during which the sub-image sensor is not exposed to light within the mirror operation period (up-down period) in the next photographing operation is output from the input switching unit to the signal processor, that is, within a period from time t5 to time t8 shown in FIG. 11, the main image stored in the memory is output to the signal processor. That is, the main image is output for a period from time t6 to time t7 shown in FIG. 11. The period from time t6 to time t7 shown in FIG. 11 is shorter than the period for which the main image is output from the input switching unit to the signal processor shown in FIG. 9. This is because a DDR memory, which may be a memory capable of high-speed reading, is used and, in the example shown in FIG. 11, unlike the example shown in FIG. 9, the data transfer of the image signal used for recording is performed at a high speed.

With this process, the output of the main image stored in the memory to the signal processor only inhibits the data in the non-exposure periods of the sub-image sensor from being output. This ensures that the data obtained in exposure periods other than the non-exposure periods of the sub-image sensor can be output on the monitor.

A data set for which monitor display is not provided although the sub-image sensor has been exposed to light, as described above with reference to FIG. 9, corresponds to a data set 351 (namely, 351a to 351c shown in FIG. 11). The data set 351 is not allowed for the monitor output operation in the example shown in FIG. 9 because the output timing thereof overlaps the output timing of the main image output from the input switching unit to the signal processor. In the present exemplary embodiment, however, the output of the sub-image sensor is output from the input switching unit to the signal processor to perform monitor display.

As shown in FIG. 11, a next photographing process is executed and a mirror movement occurs, resulting in a non-exposure period of the sub-image sensor. In this non-exposure period, the main image is read from the memory and is output to the signal processor. This enables all outputs of the sub-image sensor subjected to exposure to be displayed as live view images.

In the example shown in FIG. 11, a next photographing process is executed and a mirror movement occurs, resulting in a non-exposure period of the sub-image sensor. By transferring data in this non-exposure period, all outputs of the sub-image sensor subjected to exposure can be displayed as live view images. On the other hand, in a case where, for example, a next photographing process is not executed and no mirror movement occurs, a memory capable of high-speed reading, such as a DDR memory, may be used to temporarily store a main image, thereby reducing the period during which a main image is output from the input switching unit to the signal processor and the period during which live view images are missing.

While specific examples of an embodiment of the present invention have been described in detail, it is to be understood that a person skilled in the art can make modifications or substitutions to the examples of the embodiment without departing from the scope of the present invention. The examples of the embodiment of the present invention have been disclosed by way of illustrative examples, and are not to be construed as limiting the scope of the present invention. The scope of the present invention should be determined by the appended claims.

The series of processes described herein can be implemented by hardware or software, or a combination thereof. When the series of processes is implemented by software, a program having a processing sequence may be installed into an internal memory of a computer incorporated in dedicated hardware and executed, or may be installed into a general-purpose computer capable of executing various types of processing and executed. For example, the program can be recorded on a recording medium in advance. The program can be installed into a computer from the recording medium or can be received over a network such as a local area network (LAN) or the Internet and installed into a built-in recording medium such as a hard disk.

The processes described herein may be executed in parallel or individually, as well as in the order described herein, according to the performance of the apparatus that performs the processes or as necessary. The term "system" as used herein refers to a logical set of apparatuses regardless of whether or not the apparatuses are housed in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
    a main image sensor configured to obtain an image used for recording;
    a sub-image sensor configured to obtain a live view image;
    an input switching unit; and
    a signal processor,
    wherein the input switching unit receives a plurality of sensor outputs including an output of the main image sensor and an output of the sub-image sensor, switches the plurality of received sensor outputs in a time-division manner, and outputs time-division switched signals of the plurality of sensor outputs to the signal processor,
    wherein the input switching unit includes a memory, and is configured to execute a process of temporarily storing the output of the main image sensor into the memory without storing into the memory the output of the sub-image sensor being simultaneously output to the input switching unit,
    wherein, when the output of the main image sensor and the output of the sub-image sensor are simultaneously output to the input switching unit after an operation state of the imaging device is changed to a state in which the sub-image sensor is exposed to light from a state in which the sub-image sensor is not exposed to light, the input switching unit delays output to the signal processor of the output of the main image sensor input to the input switching unit and stored in the memory, and
    wherein the signal processor receives the time-division switched signals from the input switching unit, and executes signal processing on the received time-division switched signals.

2. The imaging device according to claim 1, wherein the input switching unit is configured to input the output of the main image sensor to the signal processor at a higher priority than the output of the sub-image sensor so that the input of the output of the sub-image sensor to the signal processor is stopped during a period in which the output of the main image sensor is input to the signal processor.

3. The imaging device according to claim 1, wherein the input switching unit is configured to execute a process of reading the output of the main image sensor from the memory and outputting the read output of the main image sensor to the signal processor.

4. The imaging device according to claim 3, further comprising a mirror configured to switch an optical path of a subject image between the main image sensor and the sub-image sensor,
    wherein the input switching unit sets a timing at which the output of the main image sensor is output to the signal processor so as to be included in a period during which an output of the sub-image sensor obtained during a non-exposure period of the sub-image sensor is output to the signal processor, the non-exposure period being caused by an operation of the mirror.

5. The imaging device according to claim 3 or 4, wherein the memory is a double data rate memory.

6. The imaging device according to claim 1, wherein the input switching unit is configured to output the plurality of sensor outputs to the signal processor using a multi-channel transmission line, and
    wherein the number of channels used for the output of the sub-image sensor is equal to or less than the number of channels used for the output of the main image sensor.

7. The imaging device according to claim 6, wherein the input switching unit is configured to output the plurality of sensor outputs to the signal processor using a Sub-Low Voltage Differential Signal transmission system.

8. A signal processing method for executing signal processing in an imaging device, comprising the steps of:
    obtaining, by a main image sensor, an image used for recording;
    obtaining a live view image by a sub-image sensor;
    receiving, by an input switching unit, a plurality of sensor outputs including an output of the main image sensor and an output of the sub-image sensor, switching the plurality of received sensor outputs in a time-division manner, and outputting time-division switched signals of the plurality of sensor outputs to a signal processor,
    wherein the step of receiving by the input switching unit includes the step of executing a process of temporarily storing the output of the main image sensor into a memory without storing into the memory the output of the sub-image sensor being simultaneously output to the input switching unit,
    wherein, when the output of the main image sensor and the output of the sub-image sensor are simultaneously output to the input switching unit after an operation state of the imaging device is changed to a state in which the sub-image sensor is exposed to light from a state in which the sub-image sensor is not exposed to light, the outputting to the signal processor includes delaying output to the signal processor of the output of the main image sensor input to the input switching unit and stored in the memory; and
    receiving, by the signal processor, the time-division switched signals from the input switching unit, and executing signal processing on the received time-division switched signals.

9. The signal processing method according to claim 8, wherein the step of receiving by the input switching unit includes the step of inputting the output of the main image sensor to the signal processor at a higher priority than the output of the sub-image sensor so that the input of the output of the sub-image sensor to the signal processor is stopped during a period in which the output of the main image sensor is input to the signal processor.

10. The signal processing method according to claim 8, wherein the step of receiving by the input switching unit includes the step of executing a process of reading the output of the main image sensor from the memory and outputting the read output of the main image sensor to the signal processor.

11. The signal processing method according to claim 10, wherein the imaging device includes a mirror configured to switch an optical path of a subject image between the main image sensor and the sub-image sensor,
   wherein in the step of receiving by the input switching unit, a timing at which the output of the main image sensor is output to the signal processor is set so as to be included in a period during which an output of the sub-image sensor obtained during a non-exposure period of the sub-image sensor is output to the signal processor, the non-exposure period being caused by an operation of the mirror.

12. The signal processing method according to claim 10 or 11, wherein the memory is a double data rate memory.

13. The signal processing method according to claim 8, wherein the step of receiving by the input switching unit includes the step of outputting the plurality of sensor outputs to the signal processor using a multi-channel transmission line, and
   wherein the number of channels used for the output of the sub-image sensor is equal to or less than the number of channels used for the output of the main image sensor.

14. The signal processing method according to claim 13, wherein the step of receiving by the input switching unit includes the step of outputting the plurality of sensor outputs to the signal processor using a Sub-Low Voltage Differential Signal transmission system.

15. A non-transitory computer-readable recording medium including a computer program for executing signal processing in an imaging device, comprising the steps of:
   causing a main image sensor to obtain an image used for recording;
   causing a sub-image sensor to obtain a live view image;
   causing an input switching unit to receive a plurality of sensor outputs including an output of the main image sensor and an output of the sub-image sensor, switch the plurality of received sensor outputs in a time-division manner, and output time-division switched signals of the plurality of sensor outputs to a signal processor, wherein the causing the input switching unit to receive includes the step of executing a process of temporarily storing the output of the main image sensor into a memory without storing into the memory the output of the sub-image sensor being simultaneously output to the input switching unit,
   wherein, when the output of the main image sensor and the output of the sub-image sensor are simultaneously output to the input switching unit after an operation state of the imaging device is changed to a state in which the sub-image sensor is exposed to light from a state in which the sub-image sensor is not exposed to light, the output to the signal processor includes delaying output to the signal processor of the sensor output of the main image sensor input to the input switching unit and stored in the memory; and
   causing the signal processor to receive the time-division switched signals from the input switching unit, and execute signal processing on the received time-division switched signals.

* * * * *